Patented Aug. 28, 1928.

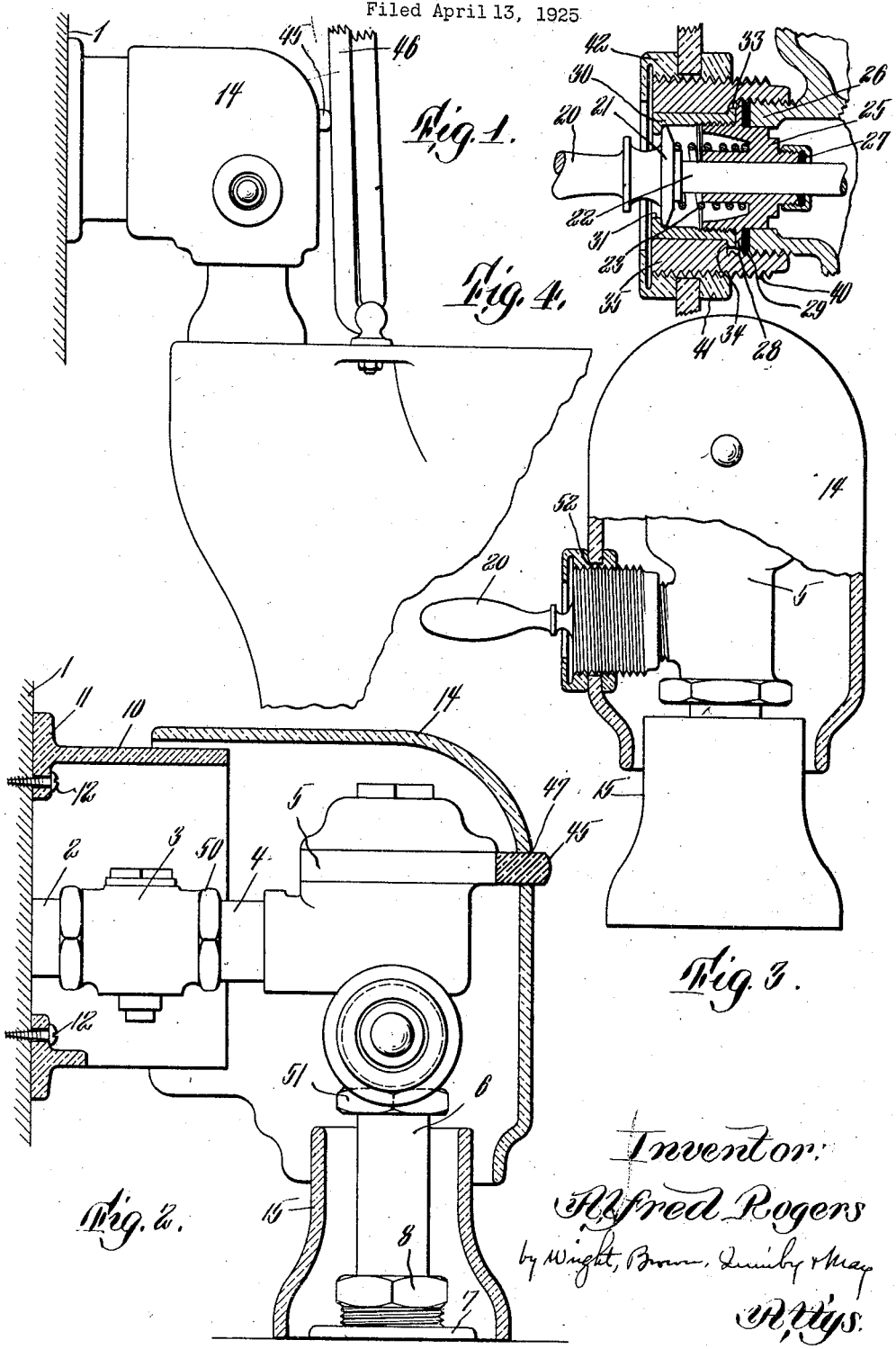

1,682,351

UNITED STATES PATENT OFFICE.

ALFRED ROGERS, OF MILTON, MASSACHUSETTS.

FLUSH-VALVE HOUSING.

Application filed April 13, 1925. Serial No. 22,886.

This invention has for its object the provision of housings of china or other non-corrodible material for the flush valves and pipe connections for water closets and the like. As such valves may usually be located at different distances horizontally from the wall through which the flush pipe projects and at different heights above the closet, the housing may be made in three parts relatively adjustable to conform to these differences. If either or both of these distances are to be maintained uniform a less number of parts will be necessary.

For a more complete understanding of this invention, reference may be had to the accompanying drawings in which Figure 1 is a fragmentary side elevation of a closet showing the housing in position.

Figure 2 is a central vertical section through the housing as assembled on the valve and pipe connections.

Figure 3 is a front elevation of the housing partly broken away to show its attachment to the valve.

Figure 4 is a detail sectional view showing this same attachment.

At 1 is indicated a wall through which extends the flush pipe 2 which is provided forwardly of the wall 1 with a shut off valve 3. This shut off valve is connected by a pipe 4 with the intake of the flush valve 5. The tail piece 6 serves as the valve connection to the closet spud 7 on which it is made up with a nut 8. Ordinarily the valve 5 may be positioned at any suitable distance horizontally from the wall 1 and vertically from the closet spud, though if desired in certain instances either of these distances may be fixed. Where these distances are not fixed the housing may comprise three parts, the inner part 10 consisting of a cylindrical sleeve portion having a flange end 11 engageable against the face of the wall and which may be fixed to the wall as by means of screws 12. Telescopically related with the outer end of this section 10 is the angle section 14 which houses the flush valve proper. The lower end of this section 14 is shown as telescopically arranged over the upper end of the section 15 which flares outwardly at its lower end surrounding the nut 8 and spud 7 and rests by its own weight on the upper wall of the closet.

The section 14 may be fixed to the valve 5. As shown in Figure 4 this valve is provided with an actuating handle 20 having a head 21 engaging the outer end of a stem 22 which is normally spring pressed outwardly into contact with this head by means of a spring 23. This stem 22 is slidable through a plug 25 engaging within the externally threaded nipple 26 and at its inner end it carries a packing gland 27 to prevent leakage around the plunger 22. The plug 25 has an outwardly extending flange 28 which is pressed against a packing ring 29 placed between it and the outer end of the nipple 26. Outwardly of the flange 28 is positioned a sleeve 30 threaded on the outer end of the plug 25 and having an inwardly directed flange 31 at its outer end to limit the outward movement of the handle 20. This sleeve 30 at its inner end has an outwardly extending flange 33 which is engaged by an annular shoulder 34 on a threaded clamping member 35 engaging the external threads of the nipple 26 whereby the flanges 33 and 28 and the packing ring 29 are forced into sealing contact with the nipple. The outer face of the member 35 is shown as threaded as at 40 and on this threaded portion is engaged a pair of nuts 41 and 42 between which the wall of the casing section 14 may be clamped. The outer nut 42 is preferably formed or covered with non-corrodible material matching the material of the casing sections 10, 14 and 15 and is preferably shaped to cover the metal parts about the handle. By screwing these nuts 41 and 42 together the section 14 may be fixed to the valve.

The valve may also be provided with a rubber bumper block 45 against which the toilet seat 46 may impinge and as shown best in Figure 2, the casing member 14 may be provided with a perforation 47 through which this bumper block projects. The sections 10 and 14 are preferably open on their lower sides as shown best in Figure 2 to permit access by a suitable wrench to the shut off valve 3.

In assembling the parts the pipe 2 and the shut off 3 being in position, but the pipe 4 and the valve 5 removed, the housing section 10 is placed in position covering over the shut off 3 and is fixed to the wall. The tail piece or connection 6 is then made up on the closet spud 7 with the nut 8 and the housing section 15 is then dropped in position over these parts resting on the closet. The valve body with the pipe 4, the handle portion and the sleeve 40 being removed, is then attached to the shut off by means of the union nut 50 and the valve body is connected to the tail piece or connection 6 by the nut 51. The housing section 14 is then slid over the valve body from the front so that the bumper 45 extends through the perforation 47 and the nipple 26 is in alinement with the lateral opening 52 in the section through which the handle 20 is to project. The nut 41 is then pushed up in position within the section 14 opposite the opening 52 and through this opening the sleeve 35 carrying the handle connections is inserted, screwed through the nut 41 and on to the nipple 26, the packing ring 29 having been inserted within the sleeve 35 and against the flange 33. As soon as this sleeve 30 has been screwed home on the nipple, the nut 34 is set up in proper position on the inside of the section 14, this being easy of accomplishment since it is accessible through the open lower portion of the section 14, and when this nut 41 is in proper position the nut 42 is screwed home on the outside of the section 12. The entire valve is now housed in its non-corrodible casing of generally angle shape. The shut off valve 3 then being turned on, the device is in operative condition.

Because of the three sections in which the housing is made, the section 14 may be engaged more or less over the sections 10 and 15 conforming to the horizontal and vertical distances of the valve from the wall and the closet, respectively, the amount of overlap of these parts being sufficient to permit a quite considerable relative movement of these parts without exposing the piping or the various connections. Of course where either of these distances is fixed the corresponding sections might be made integral.

Having thus described an embodiment of this invention it should be evident that various changes and modifications might be made therein without departing from its spirit or scope as defined by the appended claims.

I claim:

1. In combination with a valve having a casing provided with an extension, a valve actuating device projecting from said extension, of a non-corrodible housing for said valve having an opening through which said extension passes to permit said actuating device to be accessible from outside of said housing, and non-corrodible means for covering the outer end of said extension and for fixing said housing thereto.

2. In combination with a wall, a pipe projecting from said wall and having a shut off therein, a flush valve carried by said pipe, a closet, and a connection from said valve to said closet, of a non-corrodible housing for said pipe and valve extending from said wall to said closet and open from beneath to afford access to said shut off.

3. In combination with a wall, a pipe projecting from said wall and having a shut off therein, a flush valve carried by said pipe, a closet, and a connection from said valve to said closet, of a non-corrodible housing for said pipe and valve extending from said wall to said closet and comprising a plurality of telescopically arranged sections, certain of said sections being open on one side to afford access to said shut off.

In testimony whereof I have affixed my signature.

ALFRED ROGERS.